(12) United States Patent
Kobayashi et al.

(10) Patent No.: US 6,476,285 B1
(45) Date of Patent: Nov. 5, 2002

(54) METHOD OF MELTING TREATMENT OF RADIOACTIVE MISCELLANEOUS SOLID WASTES

(75) Inventors: Hiroaki Kobayashi, Hitachinaka (JP); Hiroshi Igarashi, Hitachinaka (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 585 days.

(21) Appl. No.: 08/975,657

(22) Filed: Nov. 21, 1997

(30) Foreign Application Priority Data

Nov. 22, 1996 (JP) ............................................. 8-311578

(51) Int. Cl.[7] ............................................. C22B 60/00
(52) U.S. Cl. ........................................... 588/15; 588/19
(58) Field of Search ....................... 585/19, 15

(56) References Cited

U.S. PATENT DOCUMENTS

| | | | |
|---|---|---|---|
| 5,457,264 A | 10/1995 | Kobayashi et al. | ............ 588/19 |
| 5,521,360 A | * 5/1996 | Johnson et al. | ............ 219/709 |
| 5,564,102 A | 10/1996 | Igarashi et al. | ............... 588/11 |

FOREIGN PATENT DOCUMENTS

| | | |
|---|---|---|
| EP | 0 640 992 | 3/1995 |
| JP | 7-63895 | 3/1995 |

\* cited by examiner

*Primary Examiner*—Steven Bos
(74) *Attorney, Agent, or Firm*—Wenderoth, Lind & Ponack, L.L.P.

(57) ABSTRACT

A method of melting treatment of radioactive miscellaneous solid wastes wherein, even when the wastes contain various kinds of substances in a mixed state, each of the substances is efficiently induction-heated and the whole of the wastes can be melted quickly. The radioactive miscellaneous solid wastes are charged into a water-cooling type cold crucible induction melting furnace disposed within a high-frequency coil. A plurality of high-frequency currents each having a frequency suitable for induction-heating each of the various kinds of substances contained in the radioactive miscellaneous solid wastes are supplied to the high-frequency coil to melt the solid wastes by being induction-heated. The high-frequency currents of different frequencies may be simultaneously supplied to a single high-frequency coil or may be supplied to a plurality of high-frequency coils, respectively.

3 Claims, 2 Drawing Sheets

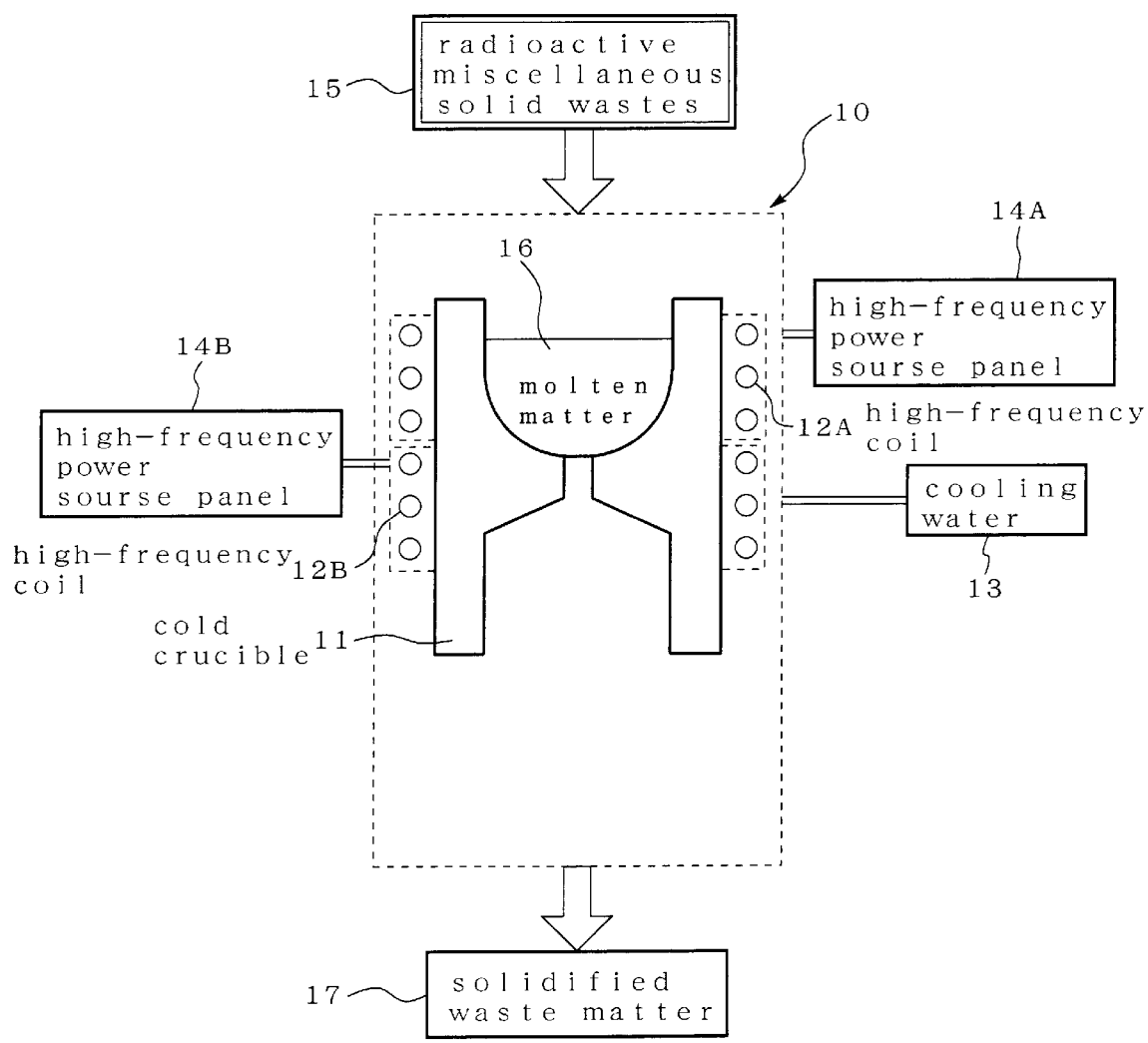

METHOD OF MELTING TREATMENT OF RADIOACTIVE MISCELLANEOUS SOLID WASTES

BACKGROUND OF THE INVENTION

The present invention relates to a method of melting treatment of radioactive miscellaneous solid wastes containing waste components of various kinds of substances such as metals, glass and the like, wherein the wastes are induction-heated effectively in a cold crucible induction melting furnace so that the volume of the wastes is reduced and the wastes are solidified.

Nuclear facilities and the like generate large amounts of radioactive miscellaneous solid wastes and a variety of kinds of substances such as combustibles, metals, glass and other non-combustibles are contained in the wastes. As a method of melting treatment of the wastes collectively in a simple manner, there is the one that was proposed by the applicant of the present application. (see Japanese Patent Laid-open No. 7-63895/1995, hereinafter referred to as the "prior art method").

The above-mentioned prior art method makes use of a cold crucible induction melting furnace having a structure in which a slit-divided water-cooling type metallic cold crucible is disposed within a water-cooling type high-frequency coil. When radioactive miscellaneous solid wastes are charged into the melting furnace and a high-frequency current is supplied to the high-frequency coil, electrically conductive substances such as metals contained in the miscellaneous solid wastes are melted first by being induction-heated. The remaining portion of the miscellaneous wastes surrounding the electrically conductive substances and having a low electrical conductivity is indirectly heated by the heat generated with the induction heating. That is, the metals act as a starting source of heating and melting the wastes so that the wastes reach a molten state entirely.

By the above-described prior art method, when the metals are melted, since a floating force works on the molten metal itself by the action of an electromagnetic field, the molten metal does not come into direct contact with the crucible. Also when the glass is melted, the contact surface of the molten glass with the crucible is cooled to become a solid layer (skull layer) and the high-temperature molten glass does not come into direct contact with the crucible. Thus, no high-temperature erosion of the crucible takes place. Further, since the crucible itself is water-cooled, it can melt the molten matter at a high temperature without being limited to its heat-resistance temperature.

However, in the above-described prior art method, a metallic substance, for example, contained in the miscellaneous solid wastes is first heated and melted by the application of an electrical current having a single frequency suitable for induction-heating the metallic substance to a single high-frequency coil, and glass and combustibles contained in the wastes are then indirectly heated by using the heat generated in melting the metallic substance as a starting heat source. Therefore, it takes much time to uniformly melt the whole of the wastes so that it is difficult for the furnace to exhibit its optimum melting performance corresponding to the quality of the solid wastes to be subjected to a melting treatment.

SUMMARY OF THE INVENTION

An object of the present invention is therefore to provide a method of melting treatment of radioactive miscellaneous solid wastes wherein, even when the radioactive miscellaneous wastes contain various kinds of substances in a mixed state, the wastes can be induction-heated in the most suitable manner for each of the substances and can be entirely melted efficiently and quickly.

According to the method of melting treatment of radioactive miscellaneous solid wastes of the present invention, the radioactive miscellaneous solid wastes containing waste components of various kinds of substances are charged into a water-cooling type cold crucible induction melting furnace disposed within a high-frequency coil and a high-frequency electrical current is supplied to the high-frequency coil surrounding the melting furnace to melt the solid wastes by being induction-heated. The above-described procedure is the same as the prior art method. The present method is characterized in that a plurality of high-frequency currents each having a frequency suitable for induction-heating each of the various kinds of substances contained in the radioactive miscellaneous solid wastes are supplied to the high-frequency coil.

In the present invention described above, even when the miscellaneous solid wastes contain waste components of various kinds of substances in mixed state, since a plurality of high-frequency electrical currents of frequencies suitable for induction-heating various kinds of substances depending upon the electrical conductivity of the respective substances can be applied to the high-frequency coil, the whole of the wastes can be melted quickly and efficiently.

When a plurality of high-frequency currents are supplied to the high-frequency coil, these high-frequency currents may have different frequencies, and may be simultaneously supplied to a single high-frequency coil, or a plurality of high-frequency coils may be arranged around the melting furnace and the above-mentioned plurality of high-frequency currents may be supplied to the high-frequency coils, respectively.

BRIEF DESCRIPTION OF THE DRAWINGS

FIG. 2 is an illustrative view of another example of the cold crucible induction melting furnace to be used in carrying out the method of the present invention.

PREFERRED EMBODIMENTS OF THE INVENTION

Figure 1:
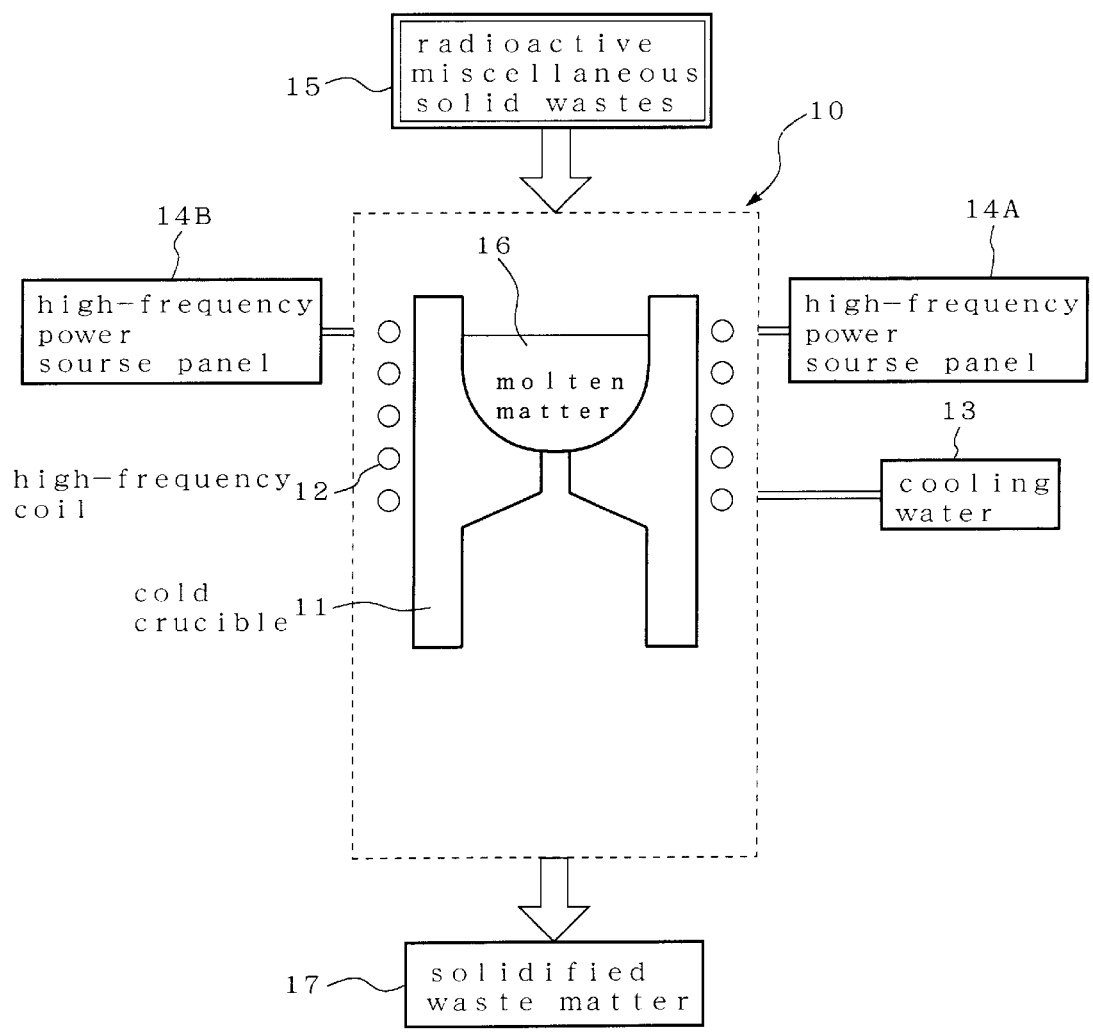
FIG. 1 is an illustrative view of one example of a cold crucible induction melting furnace to be used in carrying out the method of the present invention.

FIG. 1 shows a schematic structure of an example of a cold crucible induction melting furnace 10 to be used for carrying out the method of the present invention. A slit-divided water-cooling type copper cold crucible 11 is disposed within a water-cooling type high-frequency coil 12, as in the case of the cold crucible induction melting furnace to be used in the prior art method. The cold crucible 11 and the high-frequency coil 12 are cooled by the circulation of cooling water 13 and a high-frequency current of a predetermined frequency is supplied to the high-frequency coil 12 from a high-frequency power source panel 14A.

In the case of the induction melting furnace 10 to be used in the present invention, there is provided a high-frequency power source panel 14B independently of the high-frequency power source panel 14A so that a high-frequency current having a frequency different from that of the high-frequency power source panel 14A can be supplied to the high-frequency coil 12 simultaneously with that from the power source panel 14A. Accordingly, for example, by supplying to the high-frequency coil 12 from the high-frequency power source panel 14A a high-frequency current of a frequency band in the range of several tens kHz to several hundreds kHz suitable for melting metals having a high electrical conductivity and contained in the solid wastes, it is possible to melt the metals by induction heating efficiently. At the same time, a solid waste such as glass having a low electrical conductivity can be melted efficiently by supplying to the high-frequency coil 12 from the high-frequency power source panel 14B a high-frequency current of a frequency band in the range of several hundreds kHz to several MHz suitable for melting the solid waste such as glass having a low electrical conductivity.

Thus, radioactive miscellaneous solid waste 15 charged into the cold crucible 11 are entirely heated and melted quickly and uniformly to become a molten matter 16. Next, the molten matter 16 is poured into a canister or a stainless steel vessel (not shown) so as to be cooled and solidified to become a solidified waste matter 17.

In the case where the plurality of high-frequency currents of different frequency bands are simultaneously supplied to the high-frequency coil 12 from the high-frequency power source panels 14A and 14B, in order to avoid the entry of a different frequency electrical current from the power source panel 14A to the power source panel 14B and vice versa, it is preferable to set frequencies for the power source panels in such a manner that there exists differences by more than one digit among the power source panels.

Further, it is also possible to prevent the entry of a high-frequency current into one power source panel from another power source panel by arranging a circuit comprising a combination of suitable inductance and capacitance in the output transmission system for each of the power source panels 14A and 14B.

FIG. 2 shows another example of a cold crucible induction melting furnace used for carrying out the method of the present invention wherein like members or substances are designated by like reference numerals with respect to FIG. 1 for avoiding repetition of the same description. The point of difference in structure between the apparatus shown in FIG. 1 and that shown in FIG. 2 resides in that in the apparatus shown in FIG. 2, the high-frequency coil 12 is divided into two separate high-frequency coils 12A and 12B and the high-frequency current from the high-frequency power source panel 14A is supplied to the high-frequency coil 12A while the high-frequency current (having a different frequency from that of the high-frequency power source panel 14A) from the high-frequency power source panel 14B is supplied to the high-frequency coil 12B.

The present invention will now be described by way of experimental example. The cold crucible induction melting furnace used in the experimental example had the same structure as that which is shown in FIG. 1. The inner diameter of the furnace was 100 mm, the depth thereof was 160 mm and the furnace was divided into ten (10) segments. The size of the high-frequency coil was such that the outer diameter of the coil was 170 mm, the height thereof was 100 mm and the number of turns of the coil was eight (8). This single high-frequency coil was supplied with a high-frequency current having a frequency of 4 MHz and a high-frequency current having a frequency of 100 kHz (with the output of each being 50 kW) from the two high-frequency power source panels. A noise control circuit was provided for each of the high-frequency power source panels to thereby prevent noise interference.

1000 g of glass beads as a glass substance and 500 g of SUS as a metallic substance were charged into the furnace and the above-described two high-frequency currents of different frequencies were supplied to the high-frequency coil. As a result, both of the substances were melted in about 20 minutes. The melting temperature was about 1600° C. and it was confirmed by observation after the solidification of the molten matter that both of the substances were completely melted.

In the case where a mixture of a glass bead waste and a SUS waste was heated and melted by the prior art method of melting treatment of solid wastes using a cold crucible induction melting furnace by the application of a single high-frequency current, a mixture of the two substances with a mixing ratio of 1:1 (weight ratio) was the limitation for completely melting the two substances. It will be understood, however, that in the above-described experimental example of the present invention, even when the mixing ratio between both of the substances is 2:1, both of the substances can be completely melted.

As will be understood from the above description, in the present invention, since a plurality of electrical currents each having a frequency suitable for heating and melting each of different substances contained in radioactive miscellaneous wastes are supplied to the high-frequency coil, the most effective melting performance can be exhibited and as a result, it becomes possible to melt uniformly, quickly and efficiently the whole of the radioactive miscellaneous solid wastes having various kinds of substances mixed therein.

Further, in the case of the prior art method in which a high-frequency electrical current having a single frequency is supplied to the high-frequency coil, a mixture of a metal as a main molten matter and glass as an indirect molten matter contained in the radioactive miscellaneous wastes with a mixing ratio of 1:1 is the limitation for obtaining a uniform molten matter from the radioactive miscellaneous wastes. Contrarily, in the case of the present invention, both of the metal and the glass can be main molten matters so that miscellaneous solid wastes in various kinds of mixing ratios can be heated and melted efficiently without being restrained by the mixing ratio between the metal and the glass contained in the wastes.

What is claimed is:

1. A method of melting treatment of radioactive miscellaneous solid wastes containing a plurality of waste components which comprises charging the radioactive miscellaneous solid wastes into a water-cooled cold crucible induction melting furnace disposed within one or a plurality of high-frequency coils, and supplying a high-frequency electrical current to the one or a plurality of high-frequency coils surrounding the melting furnace to melt the solid wastes by being induction-heated, wherein a plurality of high-frequency currents having a frequency suitable for induction-heating each of the plurality of waste components, respectively, contained in the radioactive miscellaneous solid wastes are simultaneously supplied to the one or a plurality of high-frequency coils.

2. A method of melting treatment according to claim 1, wherein a plurality of high-frequency currents having different frequencies, respectively, are simultaneously supplied to a single high-frequency coil.

3. A method of melting treatment according to claim 1, wherein a plurality of high-frequency coils are arranged around said melting furnace and a plurality of high-frequency currents having different frequencies, respectively, are simultaneously supplied to said plurality of high-frequency frequency coils, respectively.

* * * * *